United States Patent [19]

Couat

[11] 4,386,247
[45] May 31, 1983

[54] TIRE PRESSURE PICK-UP
[75] Inventor: Serge Couat, Pantin, France
[73] Assignee: Societe Anonyme DBA, Paris, France
[21] Appl. No.: 289,021
[22] Filed: Aug. 3, 1981
[30] Foreign Application Priority Data
 Aug. 5, 1980 [FR] France ................. 80 17286
[51] Int. Cl.³ ........................................ H01H 35/24
[52] U.S. Cl. ............................ 200/61.25; 200/83 N;
 307/118
[58] Field of Search ........... 200/61.25, 83 R, 83 WM,
 200/80 A, 80 B, 80 C, 80 D, 80 F, 80 J, 80 L,
 80 N, 80 P, 80 Q, 80 S, 80 SA, 80 T, 80 V, 80
 Y, 80 W, 80 Z, 61.26, 61.22, 8 R; 307/118;
 340/58; 73/146, 146.2, 146.3, 146.4, 146.5,
 146.8

[56] References Cited
 U.S. PATENT DOCUMENTS

| 2,649,518 | 8/1953 | Fuehring | 340/58 X |
| 3,185,785 | 5/1965 | Howard | 200/61.25 |
| 3,433,912 | 3/1969 | Hutchison et al. | 200/83 R |
| 3,908,105 | 9/1975 | Schuler | 200/61.25 |
| 3,985,984 | 10/1976 | Cappa | 340/58 |
| 4,254,398 | 3/1981 | Matsuda et al. | 340/58 |
| 4,255,628 | 3/1981 | Broetto | 200/61.25 |

FOREIGN PATENT DOCUMENTS

| 2832447 | 2/1980 | Fed. Rep. of Germany . |
| 2854518 | 6/1980 | Fed. Rep. of Germany . |
| 2308518 | 11/1976 | France . |
| 2461248 | 1/1981 | France . |

Primary Examiner—A. T. Grimley
Assistant Examiner—Morris Ginsburg
Attorney, Agent, or Firm—Ken C. Decker; W. N. Antonis

[57] ABSTRACT

The pressure pick-up is of the type comprising an elastic metal diaphragm deformable between a first and a second state according as the pressure in the tire is lower or higher than a predetermined value, and an electrical switch controlled by the diaphragm. In accordance with the invention the metal diaphragm has the form of a spherical dome mounted to bear with its edge free at the periphery of its concave face against a seating, its convex face being subjected to the pressure in the tire.

10 Claims, 3 Drawing Figures

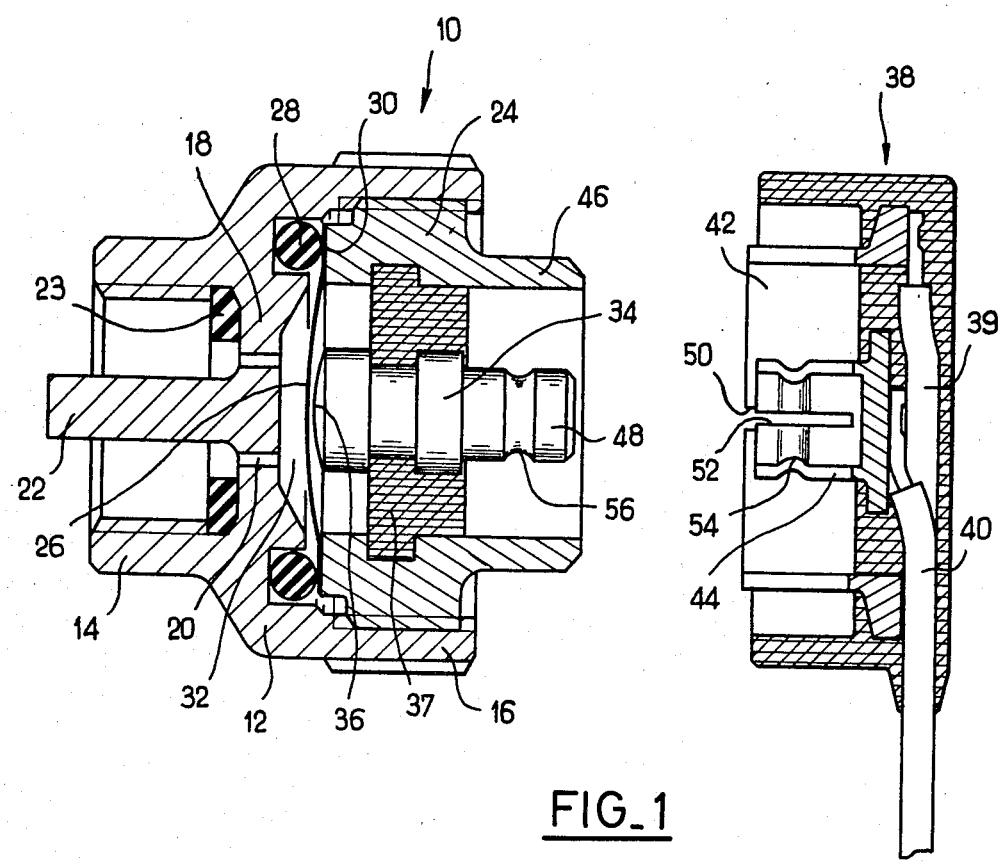
FIG_1
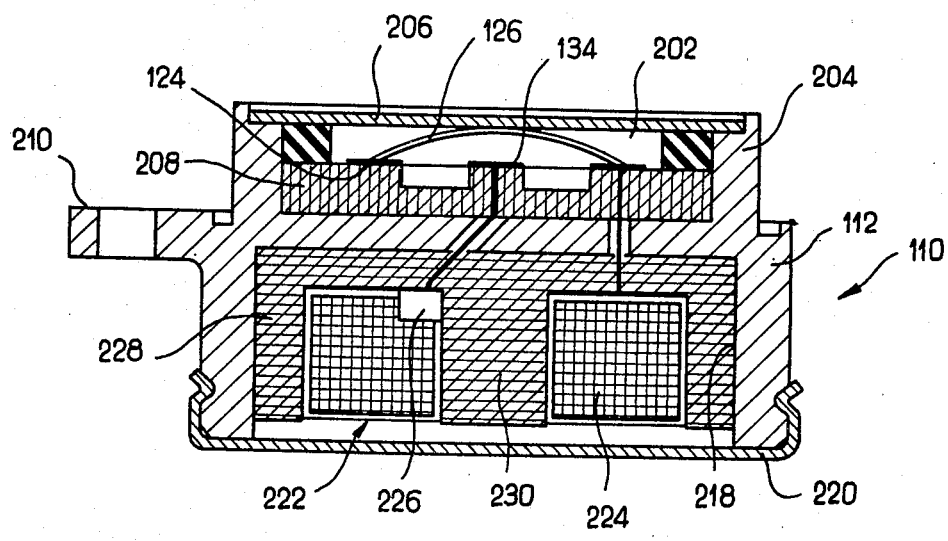
FIG_2

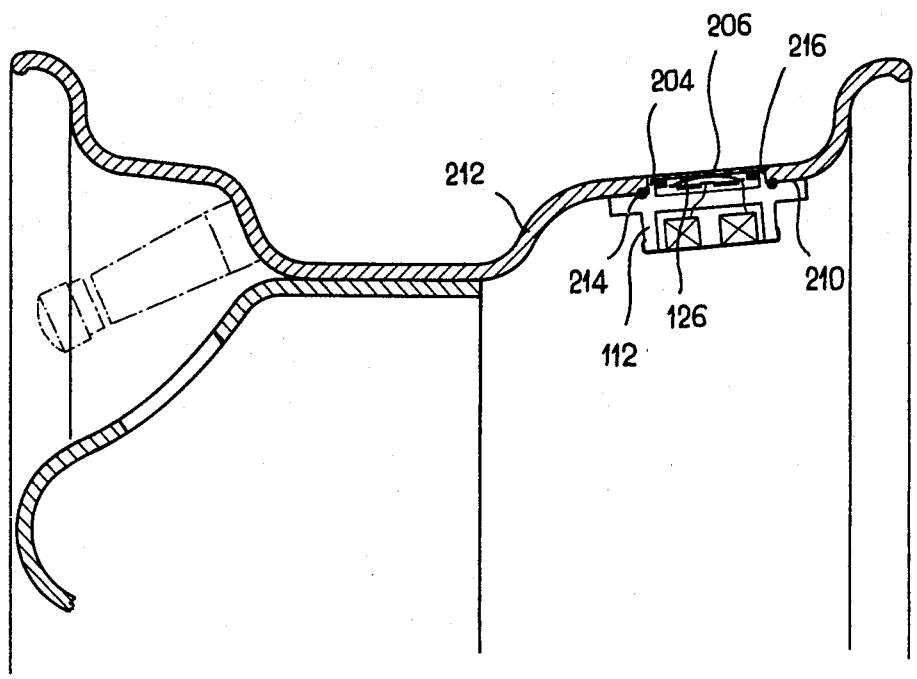
FIG_3

TIRE PRESSURE PICK-UP

The present invention relates to tire pressure pick-ups. From the U.S. Pat. No. 2,649,518, filed on the 18th Aug., 1953 in the name of K. I. Fuehring a pressure pick-up is known which comprises an elastic metal diaphragm forming part of a case, acted upon at one face of it by a force representative of the pressure prevailing in the tire and capable of being in a first state or a second state according as the pressure is lower or higher than a predetermined value, and an electrical switch controlled by the diaphragm.

The main object of the invention is to realize pick-ups of this type which are both accurate and reliable whilst putting into effect extremely simple stages of manufacture.

For this purpose the present invention proposes a tire pressure pick-up of the type comprising an elastic metal diaphragm held in a case, acted upon at one face of it by a force representative of the pressure prevailing in said tire and capable of being in a first state or a second state according as said pressure is lower or higher than a predetermined value, and an electrical switch controlled by said diaphragm, characterized in that said metal diaphragm has the form of a spherical dome and that it is mounted to bear with its edge free at the periphery of its concave face against a seating integral with said case, its convex face being subjected to said force representative of the pressure.

In accordance with a first embodiment of the invention the case of the pick-up is designed in order to be screwed onto the mouth of the valve of the tire and in accordance with a second embodiment of the invention the case is designed in order to be fitted against the outer surface of the rim of the tire.

The invention will now be described with the aid of the attached drawings in which:

FIG. 1 represents a first embodiment of a pressure pick-up in accordance with the invention;

FIG. 2 represents a second embodiment of a pick-up in accordance with the invention; and FIG. 3 illustrates the mounting of the pick-up as FIG. 2 on the rim of a tire.

The pick-up 10 represented in FIG. 1 comprises a body 12 preferably produced from plastics matter. The body 12 comprises a front tubular portion 14 tapped for reasons explained later, a rear tubular portion 16 likewise tapped and a central wall 18 onto which are connected the two tubular portions 14 and 16. The central wall 18 is pierced by passages 20 and has a projection 22 coaxial with the front tubular portion 14, the role of which will be made clear later. At the bottom of the front tubular portion 14 is housed an annular airtight seal 23.

Into the rear tubular portion 16 is screwed an annular seating 24 produced from material conductive of electricity. A metal membrane 26 in the form of a spherical dome is held in place at the bottom of the tubular portion 16 in the following manner: the periphery of the convex face of the membrane 26 is fitted in an airtight manner against a toroidal seal 28 which in turn has an airtight bearing against the central wall 18 whilst the periphery of the concave face of the membrane 26 bears against the front end 30 of the seating 24, the edge of the membrane 26 being free radially. In that way, between the membrane 26 and the central wall 18 a pressure chamber 32 is defined into which open the passages 20.

An insulating bush 37 ensures the fixing of a contact 34 inside the seating 24 and coaxially with it. The contact 34 has the shape of a rod the front end 36 of which is located slightly prominent with respect to the plane defined by the front end 30 of the seating 24.

Finally a removable connector cap 38 enables the seating 24 and the contact 34 to be connected to conductors 39 and 40 of an alarm circuit. The conductors are partially embedded in the material of the cap and in electrical contact with two concentric connector bushes 42 and 44 which are also partially embedded in the material of the cap.

The two connector bushes are designed in order to come and fit respectively over the rear ends 46 and 48 of the seating 24 and the contact 34, notches 50 and 52 enabling the bushes to be deformed elastically towards the outside in order to ensure a gripping contact between the bushes and the rear ends aforesaid. The inner bush 44 includes a neck 54 which cooperates with a circumferential throat 56 in the rear end 48 of the contact 34 in order to prevent accidental disconnection of the cap.

The operation of this detector is as follows:

The body 12 of the detector 10 is screwed onto the mouth of the valve (not shown) of the tire, the seal 23 ensuring airtightness between the valve mouth and the body. The projection 22 pushes back the pin of the valve in the tire in order to keep it open and put the inner volume of the tire in communication with the pressure chamber 32 in which then prevails the same pressure as inside the tire. When this pressure is greater than a pressure predetermined by the characteristics of the metal membrane 26 the latter is deformed elastically from the spherical state in which it is shown, towards a "flattened" state in which its concave face is in contact with the front end 36 of the contact 34, thus establishing an electrical path between the seating 24 and the contact 34. It will be observed that the seating 24, the membrane 26 and the contact 34 in that way form an electrical switch. The "free edge" contact of the membrane 26 against its seating 24 favours this elastic deformation of the membrane and thus enables both a better sensitivity and better reliability of the pick-up.

The second embodiment represented in FIGS. 2 and 3 comprises a certain number of parts similar to those of the first embodiment which has just been described. To these parts will be allotted the same references, increased by the value 100.

The body 112 of the pick-up 110, preferably produced from plastics matter, comprises a front cavity 202 bordered by an annular projection 204 and closed in an airtight manner by a flexible membrane 206. Inside the cavity 202 are placed a small printed circuit plate 208 and the elastic metal membrane 126 in the form of a spherical dome.

The periphery of the concave face of the membrane 126 bears with a free edge against an annular conductive area 124 of the printed circuit 208 which therefore acts as a seating for the membrane 126. The printed circuit 208 includes a central conductive area 134 which acts as a contact for the membrane.

As shown in FIG. 3 the body 112 comprises a radial shoulder 210 provided in order to come into contact against the outer face of a rim 212 upon which is mounted the tire (not shown), with a seal 214 ensuring the airtightness of the mounting. The annular projection 204 from the body 112 is received in an opening 216 in the rim and the distance separating the shoulder 210 from the flexible membrane 206 is such that the latter is substantially flush with the inner surface of the rim.

The operation of this pick-up is the same as that of the pick-up illustrated in FIG. 1, the elastic metal membrane 126 being deformed from the spherical state in which it is shown towards a "flattened" state in which its concave face is in contact with the central area 134 of the printed circuit 208, thus establishing an electrical path between the annular area 124 and this central area 134 of the printed circuit.

It will be observed that the location of the flexible membrane 206 at the level of the inner surface of the rim offers the two following advantages: firstly as no portion of the pick-up projects with respect to the inner surface of the rim the pick-up is much less vulnerable to mechanical damage at the time of dismounting or remounting the tire than certain known pick-ups of the prior art.

If one refers again to FIG. 2 it will be observed that the body 112 of the pick-up comprises in addition a rear hollow 218 closed by an airtight cap 220, in which are held the parts of a resonant circuit 222. This circuit comprises an inductive winding 224 and a tuning capacitor 226 connected in series. As shown, the winding 224 and the tuning capacitor 226 are embedded in an annular receptacle 228 including a central care 230. This receptacle may be produced from plastics matter or else from resin moulded over the unit consisting of the winding 224 and capacitor 226. The areas 124 and 134 of the printed circuit 208 are connected to this circuit, which consequently becomes out of service or in service according as the metal membrane is in its spherical state or its flattened state.

As well known in the art, the resonant circuit 222 enters into magnetic coupling at each rotation of the rim with an oscillatory circuit (not shown) mounted on a non-revolving portion of the vehicle.

When compared with the pick-up known from the U.S. Pat. No. 2,649,518 already mentioned, it may be observed firstly that the two embodiments of pick-up which have just been described are simple to manufacture and to mount on the tire or on its rim.

Secondly the mounting of the diaphragm in the form of a spherical dome to bear with a free edge against its seating, enables avoidance of introducing at the periphery of the diaphragm stresses which go against reliability of the pick-up. In short, these stresses which appear both during the course of the shaping of the diaphragm known from the prior art and in the mounting of this diaphragm upon the rim of the tire, are practically non-existent in the pick-up in accordance with the present invention.

I claim:

1. Pressure pick-up device for comparing a pressure to be measured with a reference pressure comprising a housing having a wall defining a chamber therewithin, a resilient diaphragm mounted in said chamber and shiftable between first and second conditions when the pressure differential across said diaphragm increases to a predetermined amount, said diaphragm having a pair of opposite sides, one of said sides being adapted for communication to the pressure to be measured, the other side being adapted for communication to the reference pressure, and switch means responsive to shifting of said diaphragm between said first and second conditions, said diaphragm having a concave portion and a peripheral outer edge circumscribing said diaphragm, said switch means including a seating member engaged by the concave portion of the diaphragm as the latter shifts between said first and second conditions, a peripheral portion of said diaphragm cooperating with the wall of the housing to define a space between the peripheral edge and the wall to permit free movement of said peripheral edge toward and away from the wall when diaphragm shifts between the first and second conditions.

2. The invention of claim 1, and sealing means carried by said housing and sealingly engaging the peripheral portion of said diaphragm.

3. The invention of claim 1, wherein said housing is made of an electrically insulative material and said seating member and said diaphragm are made of an electrically conductive material.

4. The invention of claim 1, wherein said switch means includes an annular conductive area circumscribing said seating member, the peripheral portion of the diaphragm engaging said annular conductive area.

5. In combination, a rim, a tire mounted on said rim, and a pressure pick-up responsive to the pressure in said tire, said tire pressure pick-up comprising a housing having a wall defining a chamber therewithin, a resilient diaphragm mounted in said chamber and shiftable between first and second conditions when the pressure differential across said diaphragm increases to a predetermined amount, said diaphragm having a pair of opposite sides, one of said sides being communicated to the pressure in said tire, the other side communicated to a reference pressure, and switch means responsive to shifting of said diaphragm between said first and second conditions, said diaphragm having a concave portion and a peripheral outer edge circumscribing said diaphragm, said switch means including a seating member engaged by the concave portion of the diaphragm as the latter shifts between said first and second conditions, a peripheral portion of said diaphragm cooperating with the wall of the housing to define a space between the peripheral edge and the wall to permit free movement of said peripheral edge toward and away from the wall when the diaphragm shifts between the first and second conditions.

6. The invention of claim 5, and sealing means carried by said housing and sealingly engaging the peripheral portion of said diaphragm.

7. The invention of claim 5, wherein said housing is made of an electrically insulative material and said seating member and said diaphragm are made of an electrically conductive material.

8. The invention of claim 7, wherein said housing includes a first projection portion adapted to be installed into the opening of a valve carried by said tire, and a second projecting portion extending opposite from the first projecting portion, said seating member terminating in an electrical contact extending into said second projecting portion.

9. The invention of claim 5, wherein said switch means includes an annular conductive area circumscribing said seating member, the peripheral portion of the diaphragm engaging said annular conductive area.

10. The invention of claim 9, wherein said housing includes a body portion and an annular projecting portion circumscribing said diaphragm and cooperating with the body portion to define a shoulder between said annular projecting portion and said body portion, and a flexible membrane closing said projection, said housing being mounted in an opening in said rim whereby said shoulder engages said rim and said projecting portion extends into said opening, said membrane being substantially at the level of the inner surface of the rim.

* * * * *